Figure 1:
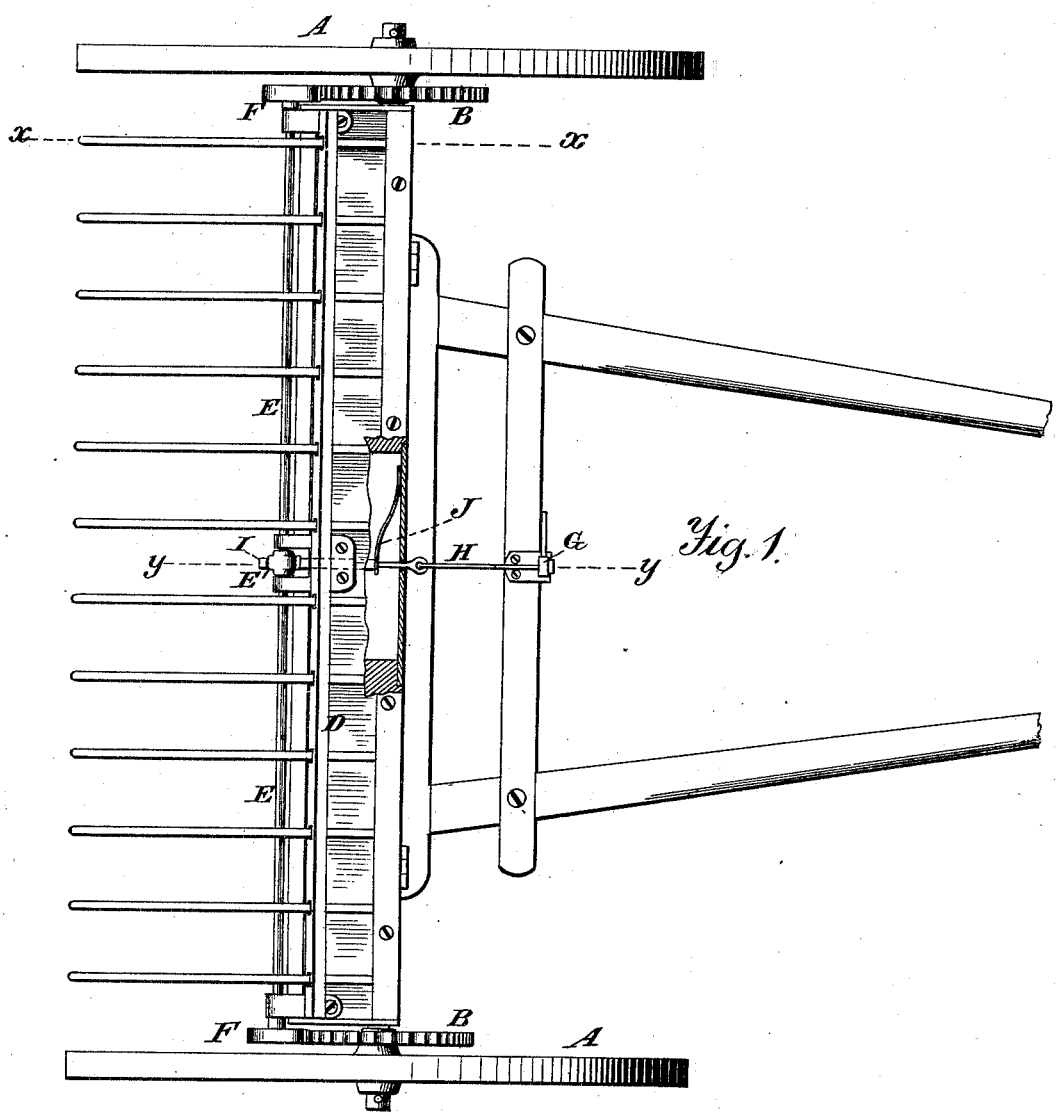

2 Sheets—Sheet 1.

A. OBENCHAIN.
Horse Hay-Rake.

No. 215,237. Patented May 13, 1879.

Witnesses.
A. Ruppert,
C. M. Connell

Inventor.
Albert Obenchain
Per Jas. M. Blanchard
Attorney

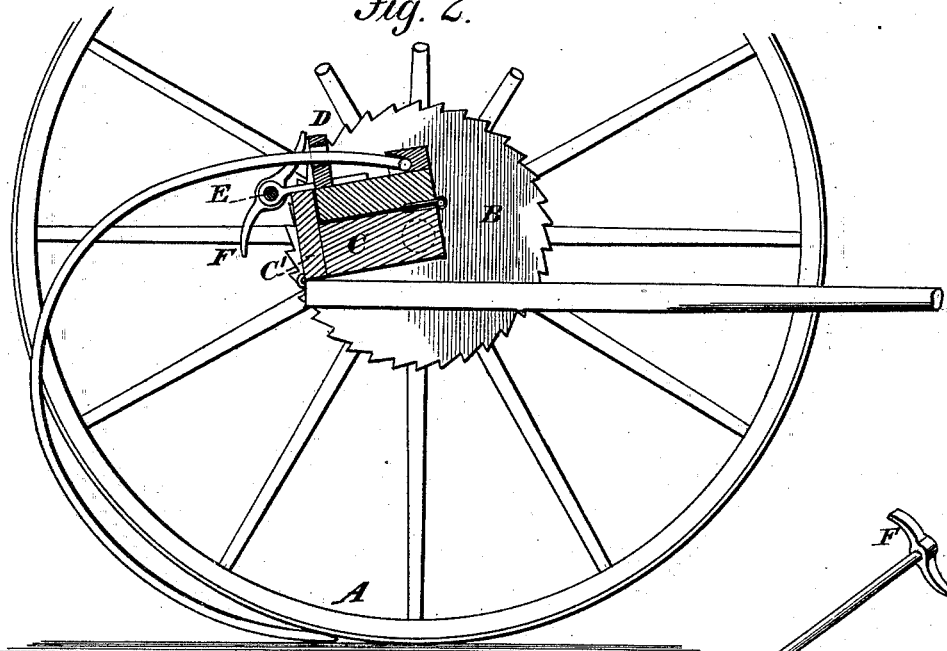
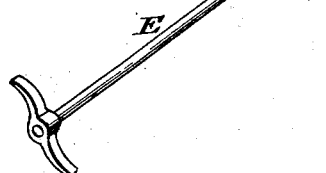
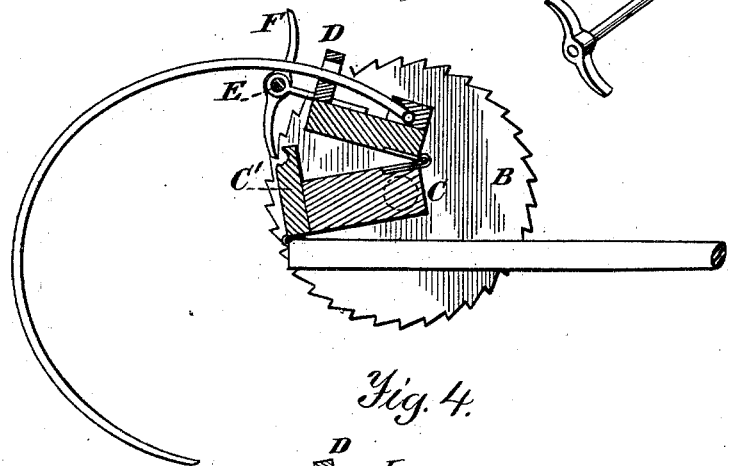
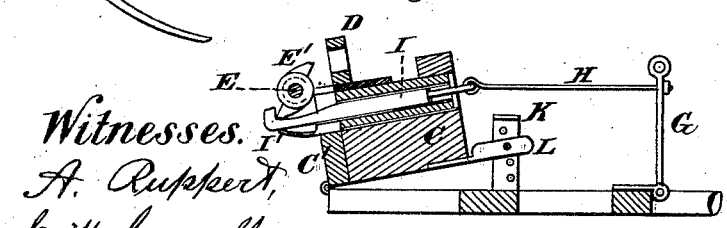

UNITED STATES PATENT OFFICE.

ALBERT OBENCHAIN, OF SPRINGFIELD, OHIO.

IMPROVEMENT IN HORSE HAY-RAKES.

Specification forming part of Letters Patent No. 215,237, dated May 13, 1879; application filed January 28, 1879.

*To all whom it may concern:*

Be it known that I, ALBERT OBENCHAIN, of Springfield, in the county of Clarke and State of Ohio, have invented certain new and useful Improvements in Horse Hay-Rakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a plan view of my improved rake, showing the parts in position for gathering a load, the forward ends of the shafts being broken away, and the carrying-wheels being in position on their axle. Fig. 2 is a sectional elevation on line $x\ x$ of Fig. 1, showing a portion of one of the carrying-wheels, a portion of one of the shafts, one of the ratchet-wheels which dump the load, the air-cushion, one of the ratchets, and the manner of attaching the teeth to the swinging portion of the air-cushion, the parts being in the proper position for gathering the hay, and the outer ends of the teeth resting upon the ground. Fig. 3 is also a cross-section, showing one of the ratchet-wheels, the ratchet being engaged therewith, the air-cushion, and the teeth of the rake, the parts being in the positions which they assume when the teeth are being raised to dump their load. Fig. 4 is a sectional elevation on line $y\ y$ of Fig. 1, showing the air-cushion, the revolving shaft which carries the pawls, with a tripping cam or hook placed thereon, the tripping mechanism and a device for raising and lowering the outer ends of the teeth, and the supports for the upper ends thereof; and Fig. 5 is a perspective view of the revolving trip-shaft, showing the revolving ratchets upon its ends and the tripping-cam at its center.

Corresponding letters denote like parts in all of the figures.

This invention relates to what are termed "horse hay-rakes;" and it consists, first, in providing such machines with a rotating shaft carrying rotating pawls for raising the teeth from the position in which they are placed for gathering the load to the required position for dumping the same; secondly, it consists in providing such machines with a revolving cam for placing the rotating pawls in position to be operated or rotated by ratchet-wheels driven by the carrying-wheels; thirdly, it consists in providing such machines with an air-cushion, into or upon which the swinging portion of the rake-head falls as the teeth assume their gathering position; fourthly, it consists in providing a head for such machines, the tilting mechanism of which is placed so far in the rear or in front of the axle thereof as to give the rotating pawls sufficient movement to cause the points of the ratchet-wheels with which they are in contact to pass beyond the reach of the points of the pawls, and thus allow the swinging portion of the head to fall back onto its cushion, and thus carry the teeth to their gathering positions; finally, it consists in certain combinations of the parts of which it is composed, as will be more fully set forth hereinafter.

In constructing machines of this character, I use any of the well-known forms of carrying-wheels A A, of the requisite diameter, and to the inner surfaces of these wheels there are secured, in a such a manner as to cause them to rotate with them, ratchet-wheels B B, the peripheries of which are provided with teeth, as shown, straight upon one of their sides and beveled upon the other, in order that when engaging with the pawls to carry the teeth of the rake into its dumping position there may not be any slipping of the pawls upon said wheels, and also, in order that, when the machine is moving backward, the pawls shall not be operated. Extending from one of these ratchet-wheels to the other is a box or trough, C, which serves the double purpose of an axle and an air-cushion, its ends being supplied with arms or rounded portions, upon which the carrying and the ratchet wheels rotate. That portion of this cushion or axle which is between the wheels is constructed substantially as shown in Figs. 2, 3, and 4 of the drawings, and consists of flat pieces of wood, of any suitable width and thickness. Upon the outer ends of these the rounded portions of what is termed the "axle" are formed, or these portions may consist of pieces of metal secured thereto. It is also provided upon its rear edge with a flange, C′, which rises above the upper edge thereof, and across its ends there are placed, for convenience, strips of thin metal, which, together with the other parts, form a box or trough, for a purpose soon to be described.

To the portion C of the last-described device the rake-head D is hinged, as shown in Figs. 2 and 3. When the lower or outer ends of the rake-teeth are in their proper positions for gathering the hay, the head rests upon the portion C of the box or trough, as shown in Fig. 2; but when the rake is loaded and the ratchets are applied to the wheels it rises into the position shown in Fig. 3, and continues to rise until it is carried into or past a vertical position, or until the pawls have passed a vertical line drawn through the center of the ratchet-wheels, when the pawls are liberated from the control of the wheels and the head falls back into the position shown in Fig. 2; and it is to prevent the jar and shock that the machine would otherwise be subjected to by the falling of the head that the box or trough is supplied, which, owing to its form, as described, serves to retain an amount of air sufficient to act as a cushion for the head, and thus cause it to settle into its place without any injurious shock upon the parts of the machine.

In order that the head D may be automatically carried from the position shown in Fig. 2 to its dumping position, as above described, there is attached to its rear portion a rotating tripping-shaft, E, supported in bearings attached to said head, and allowed to revolve freely therein. Upon the outer ends of the shaft E are secured pawls F F, firmly affixed thereto, so as to revolve with it. Near to or at the center of shaft E there is affixed a double cam, E′, which also revolves with it, being for the purpose of bringing the pawls F F into contact with the ratchet-wheels, as shown in Fig. 3, after the rake-head has fallen back into the position shown in Fig. 2, which position it immediately and automatically assumes so soon as the lower ends of the pawls have passed the vertical line drawn through the wheels, as before described.

The mechanism for operating the double cam, and through it the shaft E and pawls F F, for the purpose of bringing the latter into position to be operated upon by the wheels, consists of an arm, G, pivoted to one of the shafts, or to a cross-bar attached thereto, and which extends upward to any convenient point, and has attached to it a rod, H, which extends rearward to near the forward edge of the rake-head, where it is united to a hook, I, which passes through said head at a point immediately under the cam E′, there being a spring, I′, arranged under its rear end, so as to cause the projection upon its end to engage with said cam when it has been carried rearward by the spring J. (Shown in Fig. 1.)

The arrangement of this tripping mechanism is such that, when the operator desires to dump a load, he forces the upper end of arm G forward, which has the effect to move the rod H and the hook I, and to turn the cam E′, shaft E, and the pawls F F into the position shown in Fig. 3, by which means the pawls are made to engage with the ratchet-wheels, and the continuous forward movement of the machine causes the load to be dumped, as above described, in doing which nearly a half-revolution is given to the shaft E and its pawls, and the cam and the parts are brought into position to be again operated upon by the tripping mechanism. The teeth of this rake may be of the usual curved form shown in the drawings, or they may be of any other approved form, being attached to the rake-head in the usual manner, and having a slotted guide, through which they pass, for the purpose of allowing their outer ends to rise and pass over any obstruction that they may meet with in use; and in order that these ends may be raised and lowered, as occasion may require, there is affixed to one of the cross-bars of the shafts a yoke, K, which is provided with perforations, through which a bolt or pin passes, and which holds in position in said yoke a lever, L, the rear end of which is attached to the box or trough C, and hence, as its outer end is raised or lowered, said box or trough will be more or less tilted, which will have the effect of raising or lowering the outer ends of the rake-teeth. This device may be used to raise the teeth clear of the ground when the machine is being moved from place to place and it is not required to gather anything.

Having thus described my invention, what I claim, and desire to secure by Letters Patent, is—

1. In a horse hay-rake, double-ended rotating pawls, in combination with an intermittingly-rotating shaft and cams for bringing said pawls into position to engage with ratchet-wheels for carrying the rake-teeth from their gathering to their unloading positions, said pawls, shaft, and cams being arranged substantially as described, whereby they are made capable of being partially rotated independently of the ratchet-wheel, as described.

2. The rotating shaft E, carrying rotating pawls F F, in combination with the ratchet-wheels B B and carrying-wheels A A, the parts being arranged substantially as shown, whereby they are made to carry the rake-head and teeth from their gathering to their discharging positions, and then automatically liberate them, so that they may return to their gathering position, as set forth.

3. In a horse hay-rake, the combination of the rake-head and an air-cushion, whereby, when the rake has gathered its load, carried it to the proper point, and discharged it, the jar or shock which would otherwise be occasioned by its falling back to its gathering position is avoided, substantially in the manner set forth.

4. In a horse hay-rake, the combination of a tilting head carrying upon its rear or front edge a rotating tripping-shaft and rotating pawls, the arrangement of the parts being substantially such as is shown and described, as a consequence of which the pawls are carried forward of a line drawn vertically through the center of the ratchet-wheels before the rake-head is liberated, and are then automatically released from the control of said wheels by the further movement of the same, substantially as described.

5. In a horse hay-rake, the combination of the ratchet-wheels B B, revolving upon the axle with the carrying-wheels, revolving pawls F F, and a revolving shaft, E, the parts being arranged and to operate substantially as set forth.

6. The combination of the intermittingly-rotating cam E' and shaft E, with a rod and lever for bringing the pawls into position to engage with the ratchet-wheels after the rake has been unloaded and has fallen back to its gathering position, substantially as described.

In testimony that I claim the foregoing as my own I affix my signature in presence of two witnesses.

ALBERT OBENCHAIN.

Witnesses:
    ANDREW DOBBIE,
    BEN HOLTZ.